United States Patent [19]
Bleidt et al.

[11] Patent Number: 5,671,377
[45] Date of Patent: Sep. 23, 1997

[54] SYSTEM FOR SUPPLYING STREAMS OF DATA TO MULTIPLE USERS BY DISTRIBUTING A DATA STREAM TO MULTIPLE PROCESSORS AND ENABLING EACH USER TO MANIPULATE SUPPLIED DATA STREAM

[75] Inventors: Robert Bleidt, Atlanta, Ga.; Danny Chin, Mercer County; James Timothy Christopher Kaba, Jackson, both of N.J.

[73] Assignee: David Sarnoff Research Center, Inc., Princeton, N.J.

[21] Appl. No.: 275,742

[22] Filed: Jul. 19, 1994

[51] Int. Cl.$^6$ .............................. G06F 15/16; G06F 15/80
[52] U.S. Cl. .................. 395/328; 395/509; 395/200.03; 395/174
[58] Field of Search ................................ 395/800, 200.1, 395/174, 328, 208, 200.03, 509

[56] References Cited

U.S. PATENT DOCUMENTS

| Re. 34,611 | 5/1994 | Fenwick | 348/7 |
|---|---|---|---|
| 4,057,829 | 11/1977 | Moorehead | 358/86 |
| 4,344,134 | 8/1982 | Barnes | 364/200 |
| 4,546,451 | 10/1985 | Bruce | 364/900 |
| 5,129,077 | 7/1992 | Hillis | 395/800 |
| 5,148,432 | 9/1992 | Gordon et al. | 371/10.1 |
| 5,175,865 | 12/1992 | Hillis | 395/800 |
| 5,276,681 | 1/1994 | Tobagi | 370/85.4 |
| 5,276,866 | 1/1994 | Paolini | 395/600 |
| 5,325,493 | 6/1994 | Herrell et al. | 395/375 |
| 5,341,474 | 8/1994 | Gelman et al. | 395/200 |
| 5,414,455 | 5/1995 | Hooper et al. | 348/7 |
| 5,463,732 | 10/1995 | Taylor et al. | 395/162 |

OTHER PUBLICATIONS

A. Kovalick, "The Fundamental Concepts Of Media Servers", Hewlett–Packard Co. Concept Paper, pp. 1–19 (1993).
Compcon spring '93 IEEE Computer Society Int'l., Tobagi et al., StarWorks–A Video Application Server, pp. 4–11.
Globecom '91 IEEE, Hardt–kornacki et al., Optimization Model for the Delivery of Interactive Multimedia Documents, pp. 0669–0673.
IEEE, 1991, Nagaraj et al., Design and Evaluation of a High Performance File System for Message Passing Parallel Computers, pp. 549–554.
IEEE Transaction on Computers, vol. 38, No. 12, Dec. 1989, Reddy et al., An evaluation of Multiple–Disk I/O Systems, pp. 1680–1690.

(List continued on next page.)

*Primary Examiner*—Christopher B. Shin
*Assistant Examiner*—Rehana P. Krick
*Attorney, Agent, or Firm*—William J. Burke

[57] ABSTRACT

A multiple user data storage, retrieval and distribution system containing a parallel processing computer system that forms a digital information server. The server contains a plurality of parallel processors each connected to a information storage device. The user data is stored in a distributed manner amongst the information storage devices. The distribution system dynamically allocates the users to the system based upon the user's requested operating mode. As such, during successive user service periods, all the users are supplied their requested data. The system also provides error detection and correction for the data requested by the users. Furthermore, additional data can be added to the information storage devices during each service period and select information storage devices can be recalibrated without affecting system operation. Even though the system allocates users dynamically such that the data is retrieved from the information storage devices in an arbitrary order, the system contains an output timing sequencer that generates output data in a predefined order no matter the order in which the data is retrieved from the information storage devices. The disclosed apparatus and method find applicability in video servers, medical imaging, special effects and animation and location based entertainment systems among other applications.

17 Claims, 11 Drawing Sheets

OTHER PUBLICATIONS

IEEE, 1990, Hsiao et al., Chained declustering: a New Available Strategy for Multiprocessor Database Machines, pp. 456–465.

IEEE, 1991, Gelman et al., A Store-and-Forward Architecture for Video-On-Demand Service, pp. 0842–0846.

IEEE Communication Magazine, Jul. 1992, Rangan et al., Designing an On-Demand Multimedia Service, pp. 56–64.

SYSTEM FOR SUPPLYING STREAMS OF DATA TO MULTIPLE USERS BY DISTRIBUTING A DATA STREAM TO MULTIPLE PROCESSORS AND ENABLING EACH USER TO MANIPULATE SUPPLIED DATA STREAM

The invention relates to a system for storing and accessing electronic data. More particularly, the invention relates to a data storage, retrieval and distribution system for enabling multiple system users to independently access previously stored streams of electronic data.

BACKGROUND OF THE DISCLOSURE

In traditional electronic data storage and retrieval systems, it is typical to store data in a bank or array of memory elements controlled by a central processing unit (CPU). Such data storage systems form the basis of most contemporary computer systems. Typically, the memory elements are a combination of semiconductor memory, such as dynamic random access memory (DRAM) or static random access memory (SRAM), and rotating disk magnetic memory (disk drive memory), such as a "Winchester" hard disk drive. The semiconductor memory is used for storage of data that requires immediate access by the CPU, while the disk drive memory is typically used for storing data that is less frequently accessed by the CPU.

Typically, the cost associated with using semiconductor memory to store a given amount of data is one or two orders of magnitude greater than using a disk drive memory to store that same amount of data. However, semiconductor memory offers a data latency, i.e., the time delay between when data is requested from memory by the CPU and when the requested data is actually available to the CPU, that is typically three to four orders of magnitude less than the data latency associated with disk drive memory. As such, in applications where data latency is critical, semiconductor memory is well worth the cost.

Moreover, disk drive memory typically requires data to be accessed in "block-serial" form. As such, random access to any bit of data stored in the drive is typically not possible. Also, being a mechanical device, disk drive memories suffer from mechanical failure and, as such, have a lower reliability than semiconductor memory.

In computing or data retrieval systems where multiple users can simultaneously access data stored in the system, various means are used to serially process each user's data requests. Generally, the system must simulate that each of the users has independent access to the data. Commonly, such a simulation is achieved by preemptive or round robin multitasking algorithms. A system CPU executes these algorithms which are typically embedded in the operating system of the computing or data retrieval system. As such, the CPU serially transfers control of the system's data storage memory to each user in a "round-robin" manner.

To increase the apparent throughput of a disk storage system, many computing systems employ disk drives interconnected to act as a single disk. A block of data is distributed over N disks such that each disk stores 1/N of the block in a similar location. The disks are addressed in parallel such that, after the initial latency, data from each disk is read simultaneously to decrease the time required to read the block. This increase in throughput allows the storage system to service many additional users when a multi-tasking algorithm is employed. However, multi-user operation multiplies the effective latency, If M users are being serviced, a user's request for data from a different data stream would have to be queued until M-1 users have been processed. On the average, the latency will be increased by a factor of M/2.

To increase the number of users with a given effective latency, a storage system can employ multiple CPUs arranged in a parallel processing architecture. Since, in such data storage systems, a single instruction is used by each processor to operate upon a different data stream for each processor, a multiple data computer architecture is typically used. In a multiple data architecture, each CPU is attached to a disk drive memory. As such, each CPU accesses its associated disk drive memory as instructed by a host computer. As a result, the processors can simultaneously access all the disk drives in parallel to achieve improved throughput. As such, each user receives a block of data from a disk drive through a given CPU.

To ensure that the data is continuously transferred from the system to the users, a relatively large capacity semiconductor memory is utilized to buffer the parallel output data streams from the plurality of CPUs. Such data buffering is especially necessary when the data is video or audio data that can not be interrupted during transfer to the users for viewing. In such systems, the video and audio data is transferred from the disk drives to the buffer memory as distinct blocks of data. The blocks are serially arranged in the buffer memory such that as the buffer memory is read, the blocks form a contiguous data stream for each user.

However, in such an information storage system, the buffer memory must be very large and, as such, very costly. For example, in a round-robin type access system having M users, buffer memory must temporarily store a given user's data while the other M-1 users are serviced by the parallel processing computer. In a typical video storage system, where 10–100 kbyte blocks of data are read from 100–1000 disk drives for 1000 users, the buffer memory must be 1–100 Gbytes. Such a large capacity semiconductor memory array is extremely costly.

Another disadvantage associated with using disk drives as storage media is the fact that disk drives are not capable of continuous, uninterrupted read or write operations. Typically, external commands requesting access to data are ignored or delayed when the drive performs internal housekeeping or maintenance operations. The most lengthy delay is introduced by the drive's recalibration of the head position. Such recalibration is accomplished periodically to correct mistracking errors that occur due to differential thermal expansion of the disks within the drive. Common, inexpensive disk drives require 0.1–1.0 seconds to complete a recalibration procedure, which is typically performed every 10–100 minutes of operation.

To prevent interruption of the output data streams, the data distribution system must provide additional buffer memory to store data to be used as an output during each disk drive recalibration cycle. In a typical system where data is being transferred to users at 1 to 10 Mbits/sec for each user, the buffer memory must have a capacity of 0.1 to 10 Mbits. For a system having 1000 users, 10 Gbits or 1.25 Gbytes of semiconductor memory is required.

Therefore, a need exists in the art for a multiple user data distribution system that significantly reduces the necessary capacity of buffer memory and has a data access latency period that is unnoticeable to each user.

SUMMARY OF THE INVENTION

The invention advantageously overcomes the disadvantages heretofore associated with the prior art by utilizing an inventive multiple user data distribution system. Specifically, the multiple user data distribution system contains a digital information server that is a parallel processing computer having a plurality of parallel processors each connected to an information storage device such as a magnetic disk drive, optical disk drive, random-access-memory or the like. In the preferred embodiment of the invention, an array of magnetic disk drives are illustratively utilized.

The system uses a heretofore unknown data striping method for storing information in the plurality of disk drives. This data striping method evenly divides the plurality of disk drives into a plurality of subsets of disk drives. For example, if the server contains 500 disk drives and the subset is 5 drives, then there are 100 subsets of drives. A first subset is selected and a contiguous block of data is stored in a repetitive striped fashion across the subset of disk drives. Thereafter, a second subset, adjacent the first subset, is selected and another contiguous block of data is stored thereupon in the striped fashion. This process is repeated for each of the subsets. When all of the subsets have been used to store data, the method returns to the first subset and stores the next contiguous block of data thereupon. Using this method, many sources of data can be stored in the disk drives for subsequent access by multiple users. To efficiently utilize all the processors, the input data is prearranged in a specific order that permits each of the contiguous blocks of data to be stored simultaneously in the subsets of disk drives.

Another feature of the invention is a data retrieval method that utilizes the data stored in the manner described above to improve latency over the prior art data distribution systems and to reduce the necessary size of a data buffer. The method defines a service period comprising a plurality of slots to which the users are allocated. Within a given slot, an allocated user accesses one of the subsets of the disk drives to supply data to the user. Using the inventive data access method, the users are dynamically allocated to the slots in a service period such that the specific time at which each user is serviced and the subset that services them varies from service period to service period. However, each and every user is always serviced during each service period. The allocation of the user within a service period is defined by the user's present mode of operation and its next mode of operation (the mode it will use in the next service period). Additionally, the method provides error detection and correction for the data retrieved from the disk drives. Furthermore, the method enables new data to be added to the disk drives during each service period and permits a select number of disk drives to be recalibrated without impacting the operation of the system.

Due to the dynamic allocation of the users, data would normally be generated by the server in the order that the users were allocated during each service period. Thus, the data output order would vary from service period to service period. Consequently, any data delivery system connected to the data distribution system would have to determine the present order of the data generated by the data distribution system to properly route the data to a correct user. To relieve the data delivery system of this burden, the data distribution system contains an output timing sequencer that reorders the data from the server into an order that is repeated for each and every service period no matter in what order the users are reallocated within the service period.

BRIEF DESCRIPTION OF THE DRAWING

To facilitate understanding, identical reference numerals have been used, where possible, to designate identical elements that are common to the figures.

DETAILED DESCRIPTION

Figure 1:
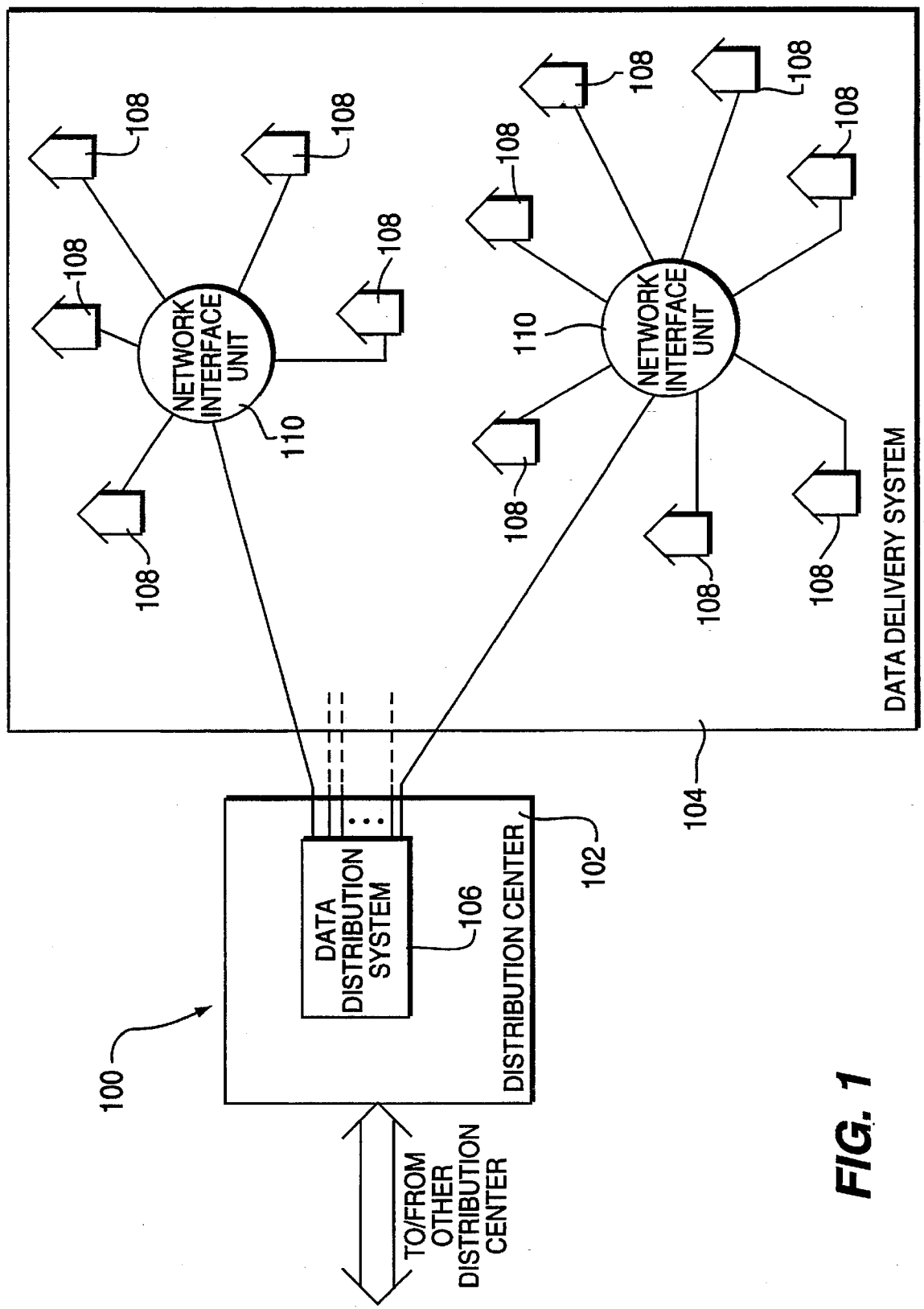
FIG. 1 depicts a high level block diagram of a multiple user data distribution and delivery system.

FIG. 1 depicts a high level block diagram of a multiple user data distribution and delivery system 100. The overall system contains two distinct system elements; a distribution center 102 having a data storage, retrieval and distribution system 106, and a data delivery system 104 having a "hub and spoke" network arrangement. Generally, the data delivery system 104 contains a plurality of users 108 linked to network interface units 110 that form conventional data distribution hubs. A delivery system interface unit (not shown) may be used to format the data from the distribution system in a manner that is compatible with the delivery system. The data link from the data distribution system (or the delivery system interface unit) to the network interface units is typically a high speed, data-multiplexed link such as a standard T1 link. The hubs demultiplex the data from these links and the users are sent serial data streams which they had previously requested from the data distribution system 106. Additionally, the users 108 control, via command links, the data flow and the type of data that they each receive. The data distribution system within the distribution center processes commands received from a plurality of users. The data distribution system interprets and implements the commands. The data delivery system could be created and operated by the local telephone system, the local cable company, or some other service provider organization. Alternatively, the data delivery system could form a bus arrangement, as in an Ethernet-style local area network or cable television distribution feeder. In cases where users are near the distribution center, the data delivery system could be replaced by direct connects to the data storage, retrieval and distribution system. The data delivery system does not form a portion of the invention and is generally described only to provide the reader with an illustration of the use of the invention.

Suffice it to say that the inventive data distribution system 106 sends data to the data delivery system 104 in a compatible data format to facilitate distribution of data to the proper users. One illustrative example of a use for the inventive data distribution system 106 is within a video-on-demand (VOD) system. Although, in the broadest sense, the inventive data distribution system can distribute any type of digital data, e.g., audio information, video information, textual information, graphics, and the like, to simplify the description of the invention, the following discussion will focus upon using the invention within a VOD system having a large number of users.

In a VOD system, the users have "set top" interface units that enable each user to select a video program such as a movie or other multimedia program and control playback of that program using video tape player-like control functions. Specifically, a user can play, pause, stop, fast-forward, fast-fast-forward, reverse, and fast-reverse the program at any time. The data distribution system rapidly processes and implements each user command. Importantly, every user of the system can simultaneously utilize the same control features on any number of programs. Thus, each user views their set top unit as a video tape player capable of accessing a large database of video programming.

The data distribution system 106 contains certain apparatus and concomitant methods for implementing the user commands with unnoticeable delay. Typically, once the command has been implemented, the requested data is transmitted onto one of a plurality of user networks by the distribution center in a multiplexed format. Network interface units, within the data delivery system, demultiplex the data streams and send the data to the appropriate user. The data may be sent in digital format or, in some cases, converted to an analog signal for use by the user. The spoke and hub data delivery system is only an illustration of one type of network arrangement. Those skilled in the art will realize that any one of the many available data delivery systems would function to transfer the data-multiplexed data from the data distribution system to the users.

Figure 2:
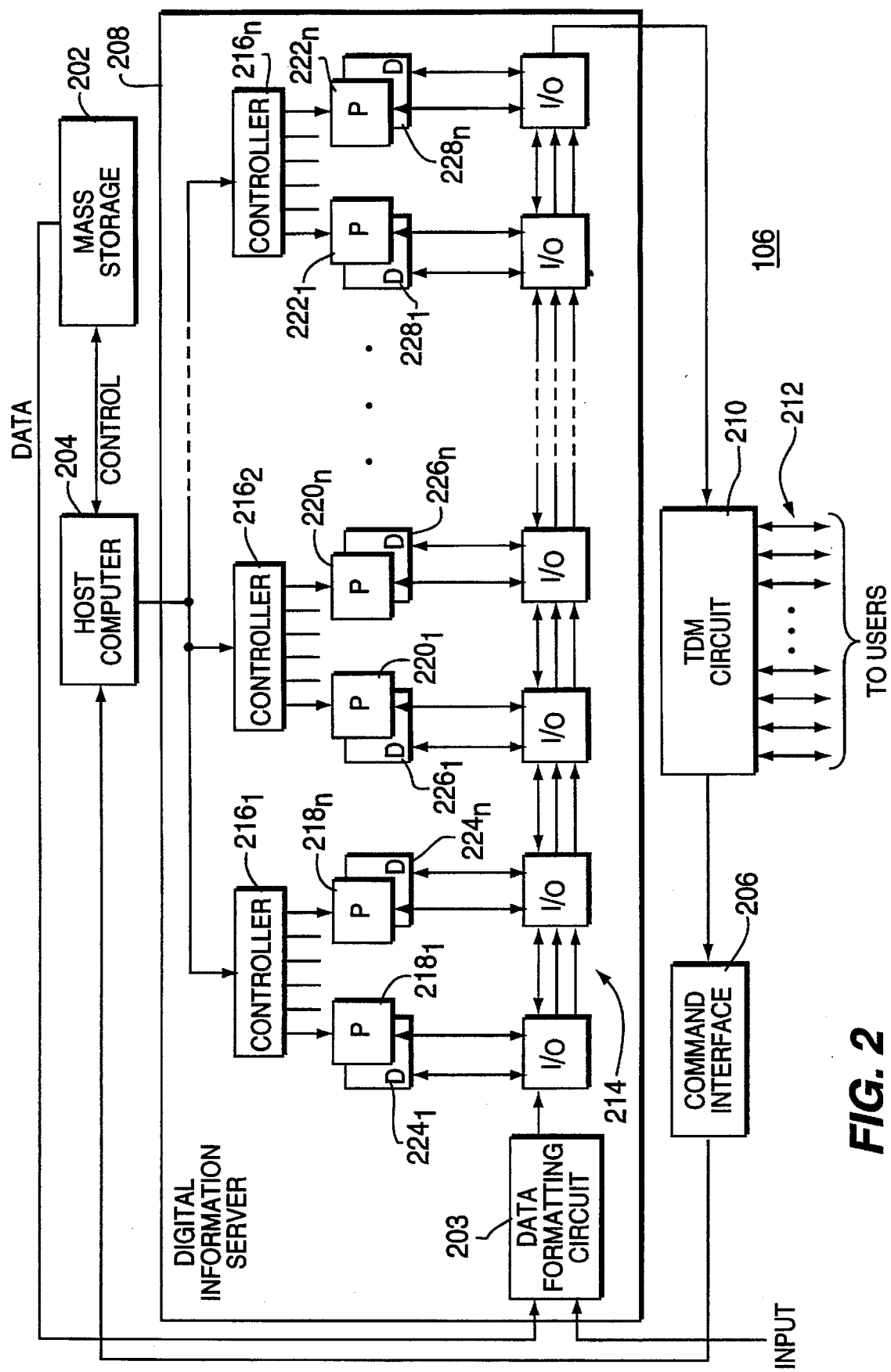
FIG. 2 shows, in accordance with the invention, a high level block diagram of a multiple user data distribution system.

FIG. 2 depicts a high level block diagram of the multiple user data distribution system 106 shown in FIG. 1. The system contains a mass storage device 202, a host computer 204, a command interface 206, a digital information server 208, and a data multiplexing circuit 210. In general, a plurality of users (not shown) are sent, via lines 212, multiplexed serial information. Each line represents a multiplexed channel that is connected to the plurality of users via the user networks.

The users control the operation of the data distribution system 106 via a command link. The command link is assumed to be imbedded within the full-duplex user lines 212. The specific implementation of the command link is typically defined by the data delivery system. Each command from the command link is interpreted by the command interface 206. The command interface 206 reformats the commands from the data delivery system into a command format that can be understood by the host computer. Using the command link, the user has the capability of selecting a video program, e.g., a selected multimedia program, and thereafter starting, stopping, pausing, reversing, and fast-forwarding the video program. In other words, the VOD system provides to each user functions that are similar to those available on a conventional video cassette player.

In operation, when a user requests information, e.g., a selected multimedia stream, the host computer retrieves the information from mass storage device 202 (for example, a video tape library) and distributes the retrieved information to the digital information server 208. The server contains local memory (a disk drive array) that stores the information. If the information that is requested by the user is presently stored in the server, then the mass storage 202 need not be accessed.

More specifically, the digital information server 208 is, in a general sense, a parallel processing computer having a multiple data stream (SIMD) architecture. Specifically, the server 208 contains a plurality of controllers $216_n$, and, associated with each controller, a plurality of processor subsystems $218_n$, $220_n$ and $222_n$. Each processor subsystem is connected to an associated mass storage device, such as Winchester-type disk drive $224_n$, $226_n$, and $228_n$. Those skilled in the art should note that other forms of mass storage, e.g., optical disk drives, random access memory, could be used instead of the magnetic disk drives. As such, the magnetic disk drives shown and described as part of the preferred embodiment of the invention should be considered illustrative of the type of mass storage that could be used.

Figure 4:
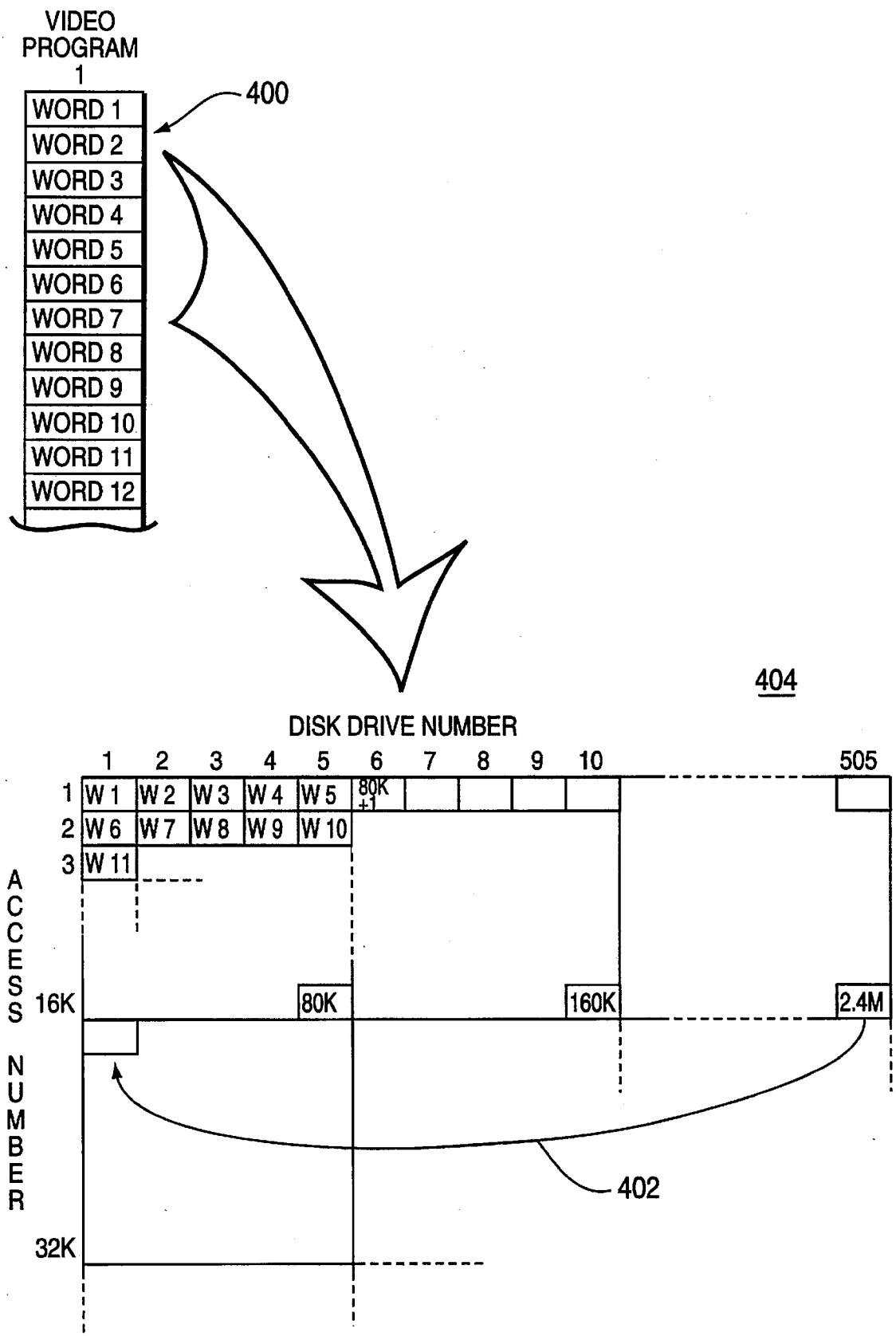
FIG. 4 is a data storage map for illustrating a preferred process for storing data in a disk drive array of the data distribution system of FIG. 2.

The mass storage device 202 may comprise a plurality of magnetic or optical disk drives or semiconductor memory, or some combination thereof. However, typically, the device is one or more magnetic disk drives. Data from the mass storage device 202 is distributed amongst the disk drives within server 208 via a data formatting circuit 203 and input/output (I/O) circuitry 214. The data formatting circuit 203 performs two functions. The first function buffers incoming data from the mass storage device 202 such that various segments of the incoming data can be reordered and stored simultaneously into the disk drives. This first function is discussed in detail with respect to FIG. 4. A second function performed by circuit 203 is to reformat and buffer digitized input data, such as "off the air" or live broadcasts such that these broadcasts can be stored within server 208. As such, once stored, this data can be viewed by users at any time in the future.

The I/O circuitry combines the parallel output data from the processor subsystems into a 64-bit wide serial bit stream (described in detail below). Throughout this disclosure, the system illustratively processes 64-bit wide serial bit streams. However, those skilled in the art will realize from the discussions herein that any other width bit streams, e.g., 128-bit wide serial bit streams, are also within the scope of this invention.

Also, the I/O circuitry contains interprocessor communications circuits that facilitate dynamic allocation of the users to the processors as well as data error detection and correction. The specific details of the I/O circuitry are provided below with respect to FIGS. 3 and 11.

Lastly, the 64-bit wide serial output data stream from the I/O circuitry 214 is transferred to the multiplexing circuit 210. The multiplexing circuit 210 then reformats the serial data in a multiplexed manner such that a large number of users, e.g., 3000 users, can be connected to the various ports 212 of the multiplexing circuit. In other words, the multiplexing circuit rearranges the serial output data stream into a plurality of multiplexed channels (each channel is represented by a port). Each user associated with a given channel is allocated a specific slot in which that use's data is transmitted through the data delivery system.

Illustratively, in a practical implementation of the inventive data distribution system, there are 128 processor subsystems, e.g., processor subsystems $118_1$ through $118_{128}$, connected to each controller, e.g., controller $116_1$. Physically, a controller and its 128 processor subsystems are mounted on a single circuit card. Each card contains 32 processor subsystem integrated circuits each including four processors. The server contains a total of four circuit cards; thus, a total of 512 processors are contained in the server. Each of the four processors is associated with various processor support circuitry, e.g., memory, instruction logic, I/O circuitry and the like, to produce four processor subsystems on each integrated circuit. The circuit cards are connected to one another via the host computer 204. The host computer 204 generally serves as an interface between the processor subsystems and the users. Additionally, the host computer functions as a main controller that monitors and controls the operation of the various controllers and processor subsystems within the digital information server 208. Those skilled in the art will realize that the number of processors used is application specific and that the number of processors in a parallel processing computer can easily be scaled up or down to fulfill a specific application for the computer. Therefore, it should be understood that the invention disclosed herein can be used in a server having any number of processors that are arranged within the server in any manner.

Figure 3:
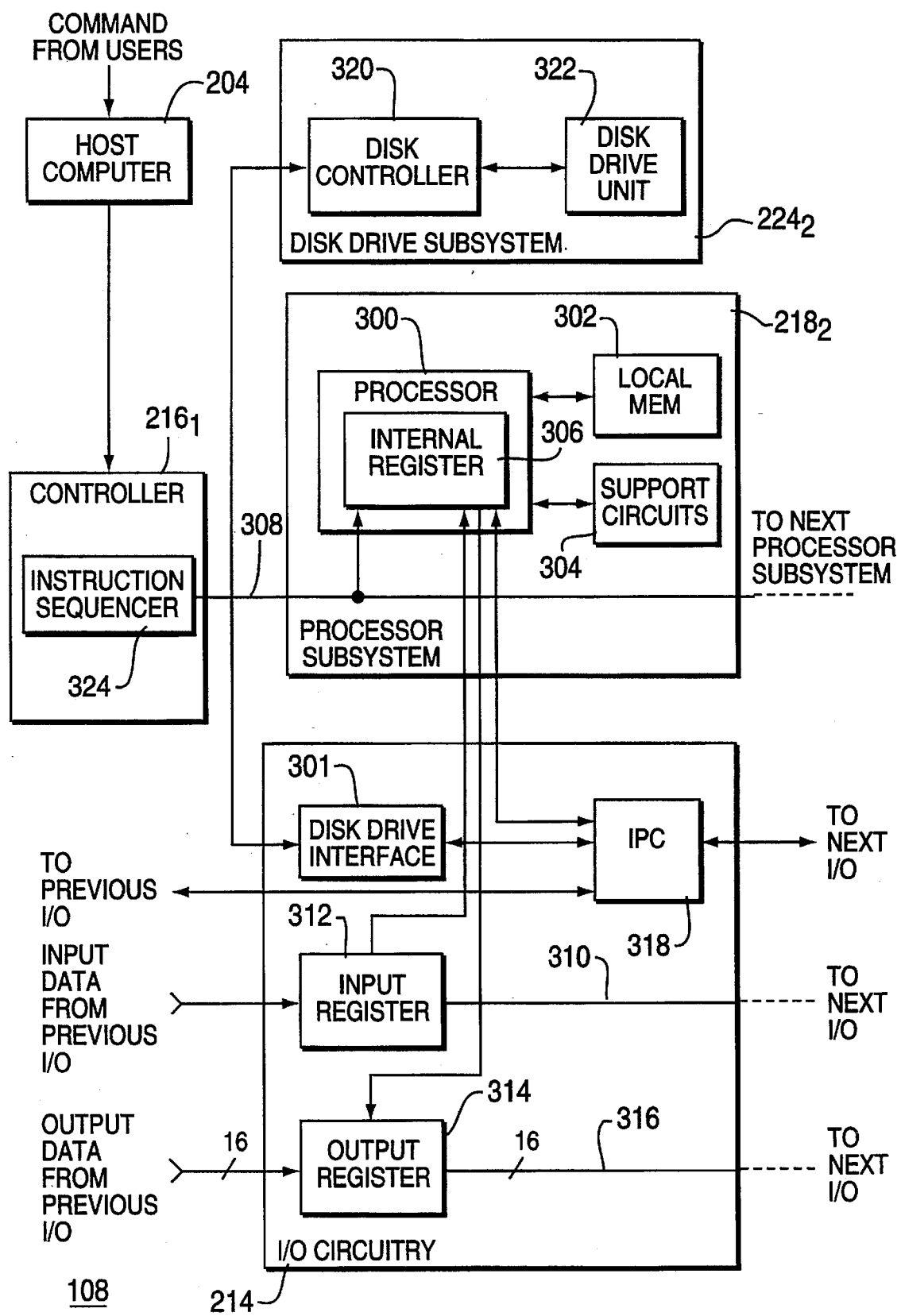
FIG. 3 depicts a detailed block diagram of a portion of the data distribution system shown in FIG. 2.

More specifically, FIG. 3 is a detailed block diagram of a portion of the digital information server 208 shown in FIG. 2. FIG. 3 depicts the details of a processor subsystem $218_2$ and a portion of the I/O circuitry 214 as well as the disk drive $224_2$ and the controller $216_1$. As discussed above, each processor subsystem contains a processor 300 as well as local memory 302 and various well-known processor support circuits 304. Also associated with each processor subsystem is I/O circuitry 214. As directed by instructions carried on the instruction bus 308, the processor performs arithmetic or logical operations on data stored in its internal registers 306 or other random access semiconductor memory 302.

More specifically, the processor 300 is supplied with input data via the input bus 310. The data is temporarily stored in an input register 312 until used by the processor. The input registers operate as conventional shift registers such that, upon each clock cycle, the system serially transfers a word of data (16-bits) from one processor subsystem to the next. Once the appropriate input data for each processor subsystem has been clocked into the input registers, the data is simultaneously loaded into the internal registers 306 of all the processors. The processor loading function is facilitated by a particular processor instruction sent, along bus 308, from the controller $216_1$.

The I/O circuitry also contains one or more output registers 314, an input register 312, a portion of the interprocessor communications (IPC) bus 318, and a disk drive interface 301. The output registers 314 are 16-bit wide registers connected to an output port of the processor, e.g., each register accepts 16-bits of parallel data and outputs 16-bits of parallel data. The output registers form a portion of an output timing sequencer (OTS) that is fully described with respect to FIG. 11. Suffice it to say, the OTS combines the 16-bit output data of each processor with the output data of four other processors to produce a 64-bit wide data element. The reason for using the OTS shall become apparent as the remainder of the system is described.

Each processor may communicate with neighboring processors via the interprocessor communications bus (IPC) bus 318. The IPC bus is a circuit arrangement that permits data and other information to be transferred from one processor to another. The IPC is bi-directional such that information can be passed in both directions along the bus. The specific implementation of the IPC bus is not important to the invention. Those skilled in the art will realize that any bus that enables the processors to share information would be appropriate. One such IPC bus is contained in a parallel processing computer known as the Sarnoff Engine that has been designed by the David Sarnoff Research Center of Princeton, N.J. The Sarnoff Engine is disclosed in a United States patent application entitled "Advanced Massively-Parallel Computer Apparatus" assigned Ser. No. 08/091,935, filed Jul. 12, 1993, which is a continuation-in-part patent application, Ser. No. 07/926,735, filed Aug. 5, 1992. These patent applications are incorporated herein by reference.

The disk drive interface 301 connects the disk drive subsystem $224_2$ to the I/O circuitry 214. As such, the disk drive interface 301 performs a serial to parallel conversion of the information from the disk to the processor and vice versa.

Each processor subsystem $218_2$ is indirectly connected (through the I/O chip and a disk drive interface) to a disk drive subsystem $224_2$ containing a disk controller 320 and a disk drive unit 322. The disk controller 320 executes commands from the processor 300 to transfer data from the disk drive unit 322 to the processor. Since the processors and disk drives may be physically distant from one another, the electrical connection between each of the disk controllers and their associated processors is typically implemented by a bit-serial, bi-directional data bus.

Each processor receives identical instructions from the instruction sequencer 324 within the controller $216_1$. The instruction sequencer stores a sequence of instructions forming a program to be executed by each of the processors. This sequence of instructions is pre-loaded into the sequencer by the host computer. The particular process by which the program is loaded and executed is well-known in the art and requires no further discussion.

Of course, the foregoing is merely an example of one illustrative implementation of the digital information server. From the following discussion, those skilled in the art will realize that other implementations are possible.

In operation, once information is retrieved as a serial word stream from mass storage, the host computer instructs the controllers to store the information in the disk drive subsystems in a manner that is generally known in the art as "data striping". Specifically, the information is stored, one 16-bit word at a time, amongst a plurality of disk drives in a striped pattern. For example, as shown in the storage map 402 of FIG. 4, the word stream 400 is data striped across 505 disk drives in a manner that will facilitate low access latency. For the following discussion of a preferred data striping technique, it is assumed there are four sets of 128 parallel processors (512 total of which 505 are used for video data storage) associated with 512 disk drives. The disk drives are consecutively numbered from 1 to 512. To store the data, the 505 disk drives are evenly divided into subsets of disk drives, e.g., five disk drives per subset. A portion of the video program is stored, in a striped pattern, within each subset. As such, disk drive 1 stores the first word (word 1) of input data 400, drive 2 stores word 2, drive 3 stores word 3, drive 4 stores word 4, and drive 5 stores word 5. Thereafter, word 6 is stored on drive 1, word 7 on drive 2 and so on until drive 5 stores word 80,000 of the information, i.e., the data striping of drive 1 through 5 is repeated 16,000 times. Thereafter, drive 6 stores the next word (word 80,001) and so on until all the information is stored across the disk drives. When disk drives 501 through 505 have respectively stored their 80,000 words of data, the system returns (wraps, as illustrated by line 402) to disk drives 1 through 5 to store the next 80,000 words. This process, striping data into each subset of drives as well as across all the subsets, is repeated until the entire video program is stored.

The foregoing data striping discussion assumed, for simplicity, that data was stored in one subset of disk drives at a time. However, to efficiently utilize the parallel processing computer, input data is stored simultaneously using all the processors and disk drives, e.g., all 505 processors and disk drives. To facilitate this simultaneous storage, the data formatting circuit (203 in FIG. 2) buffers the input data from the mass storage device and outputs a serial stream of 16-bit data words to the input registers in an appropriate order. The specific order facilitates simultaneous storage of all the words in all the input registers. For example, the data is reordered such that simultaneously stored would be words 1–5, words 80001–80005, words 160001–160005, and so on across all the disk drive subsets. In other words, the data is so reordered to permit the data words in an entire row of the data map shown in FIG. 4 to be stored simultaneously.

Similarly, another video program may be stored using this data striping method by starting storage of the second program with disk drives 6 through 10. Thereafter, the beginning of each program is offset from the beginning of a previously stored program by one subset of disk drives. As such, a plurality of video programs can be stored across the disk drives. Although one preferred manner for data striping the disk drives is described above, those skilled in the art will realize that other data striping methods can be used with the invention. Thus, the preferred method of data striping should not be construed as limiting the invention, but rather should be considered an illustrative method of data striping.

Also, for the following discussion, it is assumed that the input data stream contains parity words to facilitate error correction. Illustratively, the parity words are derived from the four preceding data words, e.g., the parity word is a bit-by-bit exclusive-OR of the bits in the four preceding data words. Thus, every fifth word is a parity word and, as such, every fifth disk drive contains the parity word for the previous four data words. Alternatively, if the parity words are not contained in the input data, they can be generated and inserted in the data stream as the data is stored in the digital information server.

Once the requested information (video program) is resident on the disk drives, the user can request that the information be sent from the disks to the user's network. For example, by manipulating a command device (not shown), a command is sent from the user to the command interface. Using the command device, the user can select information, play, reverse, fast-reverse, fast-forward, fast-fast-forward, pause or stop the playback of the information. For example, if the information is a selected multimedia stream, the user may select a specific multimedia stream from a menu on their television screen. Once the multimedia stream is selected, the user controls the playback of the multimedia stream as if they were using a conventional video cassette player. In the simplest function, a user selects play and the multimedia stream is recalled from the disk drives by the parallel processors. The data is transferred to the multiplexing circuit via the I/O circuitry. As described above with respect to FIG. 2, the multiplexing circuit formats the data in a multiplexed manner such that a number of users can be connected to the system.

Using the data distribution system discussed above, multiple users can simultaneously access the same or different information. Additionally, these users can access information at anytime and review it at a number of speeds, e.g., pausing, fast-forwarding, or reversing as desired. Thus, the data distribution system forms a central database, e.g., a video database, that can be accessed as if each user had the entire database in their home. The inventive system accomplishes such information accesses with unnoticeable delay.

Figure 5:
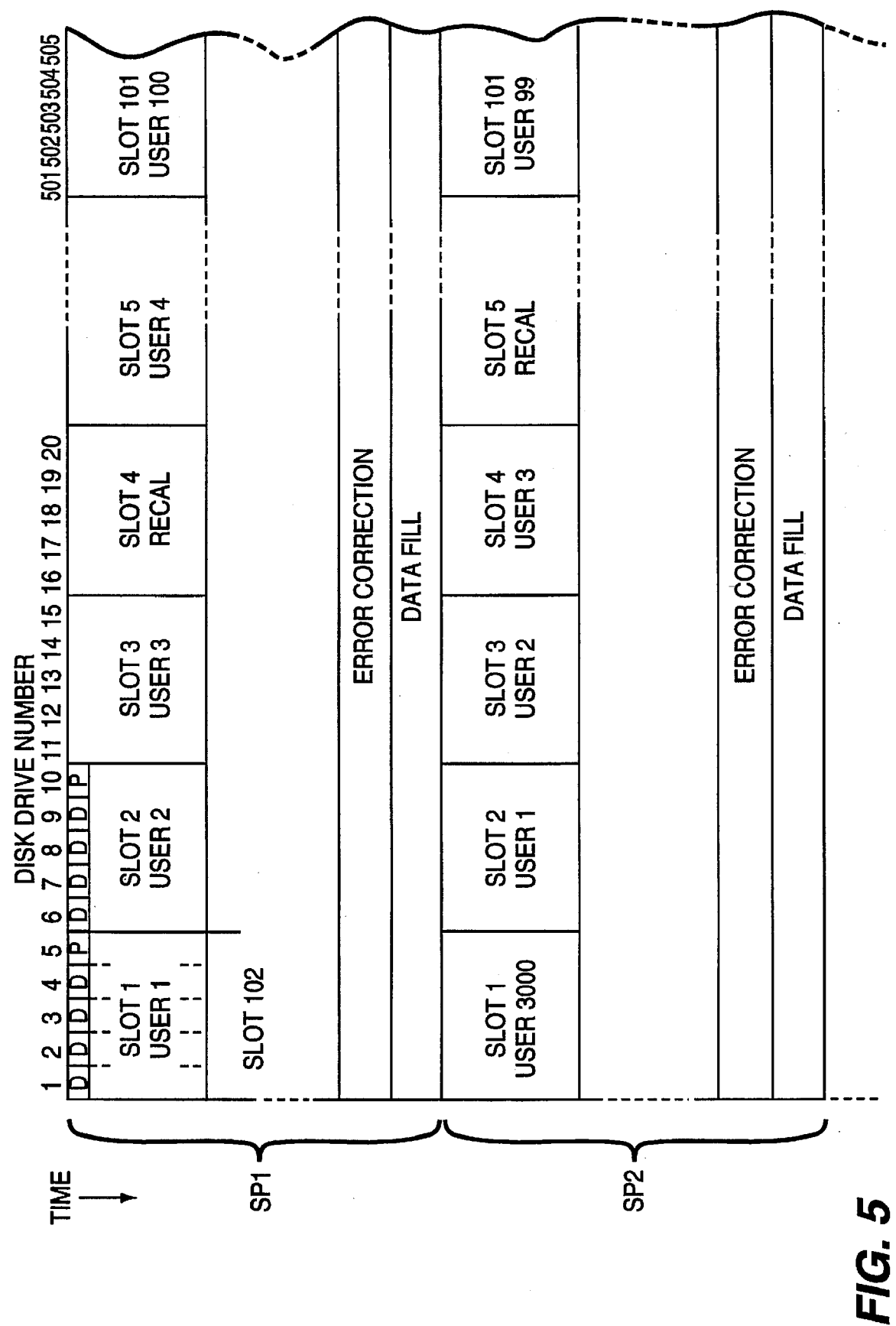
FIG. 5 is a data access map for illustrating a preferred process for retrieving data stored in the disk drive array using the storage map shown in FIG. 4.

FIG. 5 depicts a data map used to transfer requested data streams from the disk drives, through the processors, and, ultimately, to the users. Specifically, upon requesting a function, e.g., play, a user is allocated a slot within a service period. A finite number of slots exist, for example, 3200. The actual slot that a user is allocated to, as is discussed below, is dynamically allocated and may initially be any one of the available 3200 slots. Depending upon the functions used by the users, the users are reallocated to different slots during subsequent service periods. However, as is described below, some of the possible 3200 slots are reserved for implementing special functions.

In general, each slot represents repetitive accesses to consecutive "elements" of information within a retrieved block of data. These elements may contain a byte (8-bits) or as little as a single bit of information. The actual element size is application dependent. For now, in keeping with the illustrative data storage map of FIG. 4, it is assumed that each element contains four 16-bit words of video information and one 16-bit word of parity information. Additionally, there are 505 disk drives and associated processors (another 7 processors are spares that can be utilized upon failure of any one of the other processors and disk drives) that simultaneously access 100 elements of video information for 100 of a possible 3000 users. Thus, each row of data and parity words defining the 100 slots are serviced simultaneously. Within each slot, the user assigned thereto is repetitively serviced 16,000 times and the 80,000 words of data associated with those accesses are stored in local memory (RAM). Thus, during a given service period, each processor stores 16,000 words in its local memory for a given slot, i.e., after one service period which services 30 users, 480,000 words are stored in the local memory of each processor.

Within a service period, 3000 users are serviced by the 500 processors. Five processors, i.e., one subset of processors, during each service period are not utilized to service users. These processors (processors 16 through 20 in service period 1 of FIG. 5) are not used to supply user data while their respective disk drives are recalibrating. Recalibration is a conventional process that most inexpensive disk drives periodically accomplish, e.g., approximately every 10 to 100 minutes of operation. To ensure that the recalibration does not randomly occur and detrimentally impact data access, the system forces each disk drive to calibrate at a predefined time, e.g., during a predefined recalibration slot (RECAL slot). Recalibration of the subset of disk drives is completed within one service period.

The two rows of slots at the end of a service period are reserved for two special functions. The first function accesses for a second time elements containing errors that could not be corrected using the parity word, e.g., two errors occurred in a single data element. As such, the disk drives from which the errant element was first accessed are accessed a second time in an attempt to retrieve the data. If the data is retrieved without error, it is stored in local memory at the location of the errant data. Moreover, if a processor fails, the server reconfigures itself to replace the failed processor with one of the spares. If a disk drive fails, its data can be recovered by correction with the parity word. The drive may then be replaced and the parity-reconstructed data used to restore the original data to the new drive.

The second function, activated during the second special row of slots, places more data into the disk drives. For example, if a user selects a multimedia stream that is not currently stored in the disk drives, this row is used to store the data of the selected multimedia stream in the same manner as discussed above with respect to FIG. 4, e.g., storing 80,000 words of video programming over five disk drives, then storing the next 80,000 words over the next five disk drives and so on until the entire program is stored. By repeating this storage process in a successive number of service periods, an entire video program is distributively stored amongst the disk drives without impacting the data retrieval process for the users.

To recalibrate the next successive disk drive subset, e.g., drives 21 through 25, the recalibration function (RECAL) is advanced by one slot for each service period. Thus, as shown in FIG. 5, if all the users are assumed to be in the play mode, all the users are advanced by one slot with each successive service period. As such, user 1's next 80,000 words of data are now provided by processors 6 through 10 and disk drives 6 through 10, and user 2's next 80,000 words of data are now provided by processors 11 through 15 and disks 11 through 15, and so on. Error correction and data fill are provided as discussed above. Consequently, using the play function, a given user is sequentially advanced from one processor to the next to retrieve the distributed data in the order it was stored, i.e., in 80,000 word blocks.

For other functions, such as fast-forward, the user, rather than retrieving data sequentially, is jumped ahead a predefined number of slots. For example, if user 2 retrieves data in service period 1 during slot 2 and then requests fast-forward, the next data element for user 2 is retrieved in service period 2 during, for example, slot 22. Thereafter, until fast forward function is ceased, the slot from which data for user 2 is retrieved is advanced by a count of 20. The result is fast-forward through the data, e.g., a video program. The same general process is used to fast-fast-forward, reverse or fast-reverse the information. The speed of both fast-forward functions or the fast-reverse function is governed by the number of slots that are skipped. Thus, before every service period, the users must be reallocated to new slots depending upon their requested functions. The details of this reallocation process is described below.

For a pause function, a slot is used to repetitively access information from the same disk drive until the pause command is changed to another command. The stop command, of course, stops the information distribution for that user at the present location. The present disk drive being accessed is stored with a user ID in a table such that when the user resumes play the system can start sending data from the disk drive last accessed.

As a result of the data retrieval process accomplished during each service period, the local memory of each subset contains 16,000 words for each of the 30 users that a given processor services. Once one service period is complete, the system continues to access new data within the next successive service period. The data that is stored in the local memory from the preceding service period is output during the relatively long access times associated with the disk drives. As such, using the output timing sequencer (OTS, described with respect to FIG. 11), the data from a preceding service period is output to the multiplexing circuit while, simultaneously, new data is stored in the local memory for the current service period.

Figure 6:
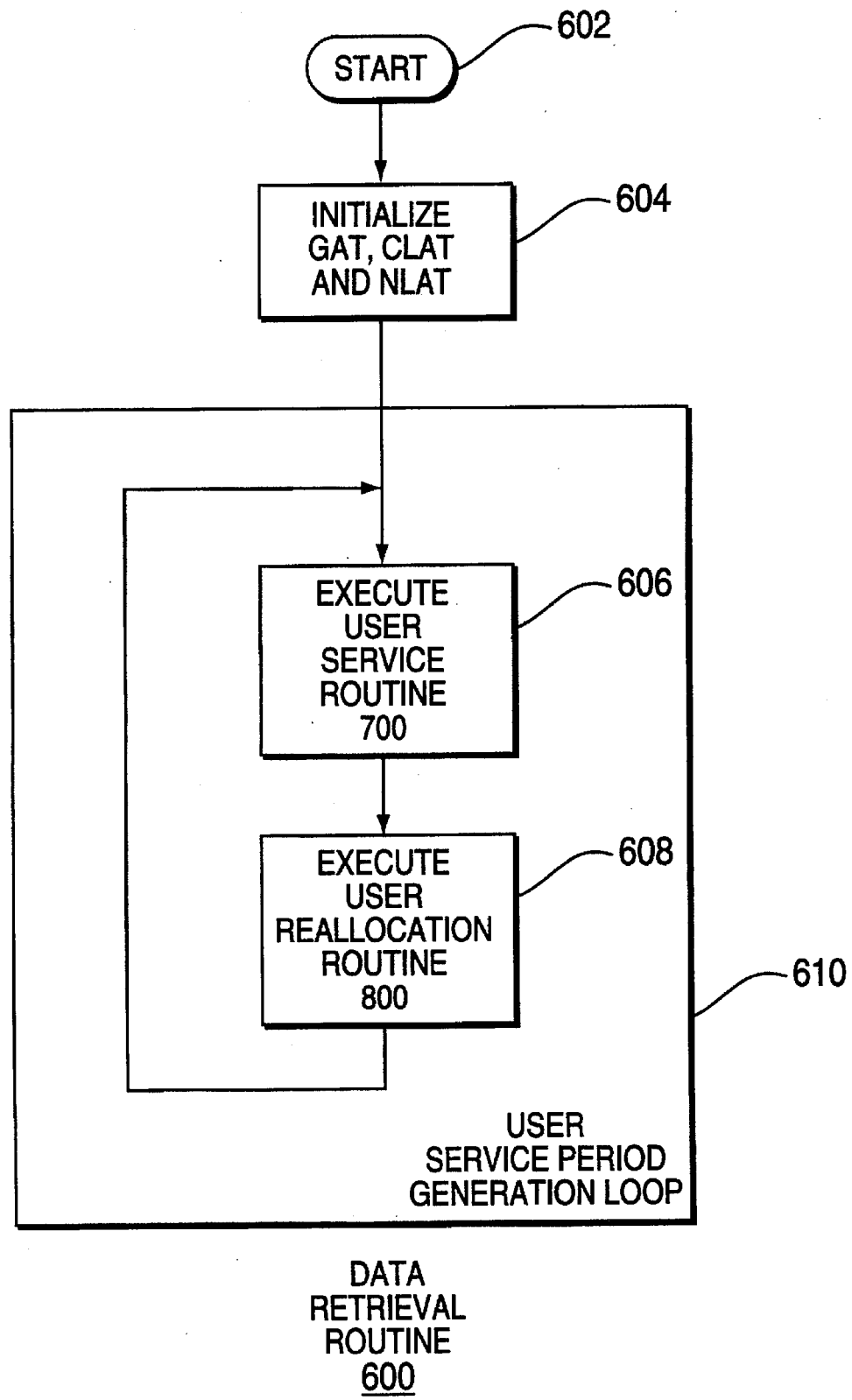
FIG. 6 depicts a flow chart of a DATA RETRIEVAL routine executed by the data distribution system shown in FIG. 2.

More specifically, FIG. 6 depicts a flow chart of a DATA RETRIEVAL routine 600 that is utilized during each service period. This routine is simultaneously executed by each and every processor. For simplicity, the following description discusses the routine as if it were executed on a single processor; however, the reader should realize that the routine is simultaneously executed on 504 other processors.

The routine is entered at step 602, labeled "START". At step 604, the routine initializes a number of tables such that the presently active users are allocated to appropriate slots. These tables include a global allocation table (GAT) and a pair of local allocation tables (LATs). The pair of LATs include a current LAT (CLAT) and a next LAT (NLAT). In general, the tables contain information concerning each available user slot's present function, e.g., the user identification (ID) of the user assigned thereto, the present and next operating mode of that user, the disk address for the next data to be accessed to service that user, and the like.

Specifically, the GAT contains information for each of the users, e.g., 3000 users. A copy of the GAT is stored in the local memory of each processor. Any alterations to the GAT, e.g., a change in operating mode of a user, are updated by the host computer. Each entry in the table is numbered from 1 through 3000 (corresponding to the user ID) and contains the next operating mode for each user and the memory address on a disk which will fulfill data retrieval for that mode. Typically, the disk address is the address of the first word in the 16,000 words that will be accessed.

On the other hand, the LATs are associated with each individual processor, e.g., a different LAT pair for each processor. The CLAT defines the data retrieval operation to be accomplished by the associated processor for the current service period. The CLAT contains a list of user IDs for the users to be serviced by the processor during the present service period, each user's present operating mode and the address of the data to be accessed. As the name implies, the NLAT defines the data retrieval operation to be accomplished by the associated processor during the next service period. The NLAT contains a list of user IDs for the users to be serviced in the next service period, their modes of operation and the address of the data to be accessed.

Thus, in step 604 of FIG. 6, the table entries are initialized for the presently active users. Thereafter, at step 606, the users are serviced, e.g., data is accessed from the disk drive by executing a USER SERVICE routine 700. Then, at step 608, the allocation tables are updated to reallocate the users to new slots for utilization during the next service period. User reallocation is accomplished by executing a USER REALLOCATION routine 800. User service period generation loop 610 is repetitively executed to produce a successive series of service periods that involve repetitively retrieving data, then reallocating the users.

Figure 7:
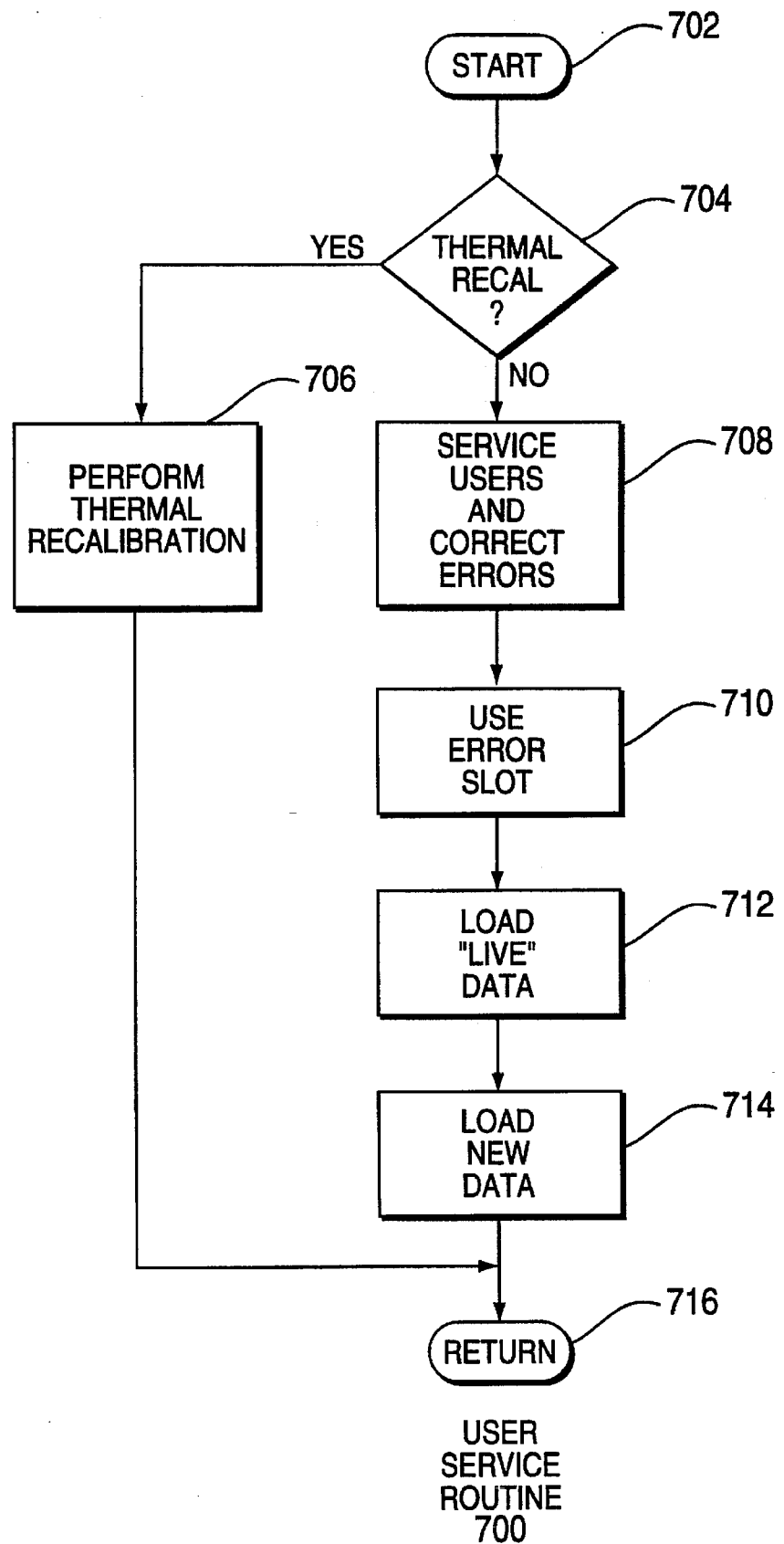
FIG. 7 depicts a flow chart of a USER SERVICE routine executed by the data distribution system shown in FIG. 2.

More specifically, as shown in FIG. 7, assuming the users are already allocated to slots, the USER SERVICE routine 700 performs all the functions to service a user's request for data. The USER SERVICE routine is entered at step 702 and proceeds to step 704 where the routine queries whether the processor executing this routine is within a thermal recalibration strip, e.g., a vertical series of slots (see FIG. 5) that are used to conduct a disk drive recalibration. The GAT, CLAT and NLAT contain, in the mode field of each table, an indication of whether the disk drive is to be recalibrated. If the query is affirmatively answered, the routine causes, at step 706, the disk drive associated with the processor to conduct a thermal recalibration of its disk drive. Alternatively, if the query of step 704 is negatively answered, the routine proceeds along the NO path to step 708.

At step 708, data for each of the 30 users handled by the processor executing this routine is accessed and stored in local memory. Such data access requires the processor to retrieve 16,000 words for each of the 30 users. The starting address of the 16000 words is contained in the CLAT for each of the users. The processor retrieves the data word at that address and then retrieves the next 15,999 words in the disk drive. Each user associated with each processor is sequentially serviced in this manner.

Furthermore, as this data is being recalled from the disk drive and stored in local memory, the processor conducts error detection. As the data is retrieved from the disk drive, both the processor and disk controller compute checkwords on the retrieved data using a convolutional polynomial. At the conclusion of a retrieval, the disk controller sends its checkwords to the processor for comparison with the processor's internally computed values. This comparison allows errors in transmission of the data to the processor to be detected.

After the data for a given user has been sent to local memory, the next user's data is retrieved. During the retrieval of the next user's data the detected errors in the previous user's data are corrected. To facilitate the error correction process, neighboring processors share, via the IPC bus, recently retrieved data words and a parity word to conduct a parity check. The parity word in combination with the other four words in an element can be used to correct any single data word error detected by the CRC error detection algorithm. If more than one word is errant, the errors cannot be corrected. Therefore, the routine 700 defines, at step 710, a special error correction slot that is utilized once all the user data is retrieved. In this slot, the errant data is accessed a second time in an attempt to correctly retrieve it. This slot, like the others, permits 16000 words to be retrieved by a given processor.

At steps 712 and 714, new data is loaded into the disk drive associated with the processor. Specifically, step 712 is used to store properly encoded "live" or "off the air" data onto the disk drive. At step 714, a block of 16,000 words of video information can be stored in the disk drive.

Lastly, at step 716, the routine 700 returns to the service period generation loop 610 of FIG. 6.

It should be noted that while the DATA RETRIEVAL routine is executing, the processor accesses the data stored in local memory during the preceding service period and outputs that data to the OTS. The OTS reorganizes the data to produce a standardized data stream that is not altered by the reallocation process. In other words, the OTS ensures that no matter what slot a user is reallocated to, the users data will be organized properly for use by the multiplexing circuit.

Figure 8:
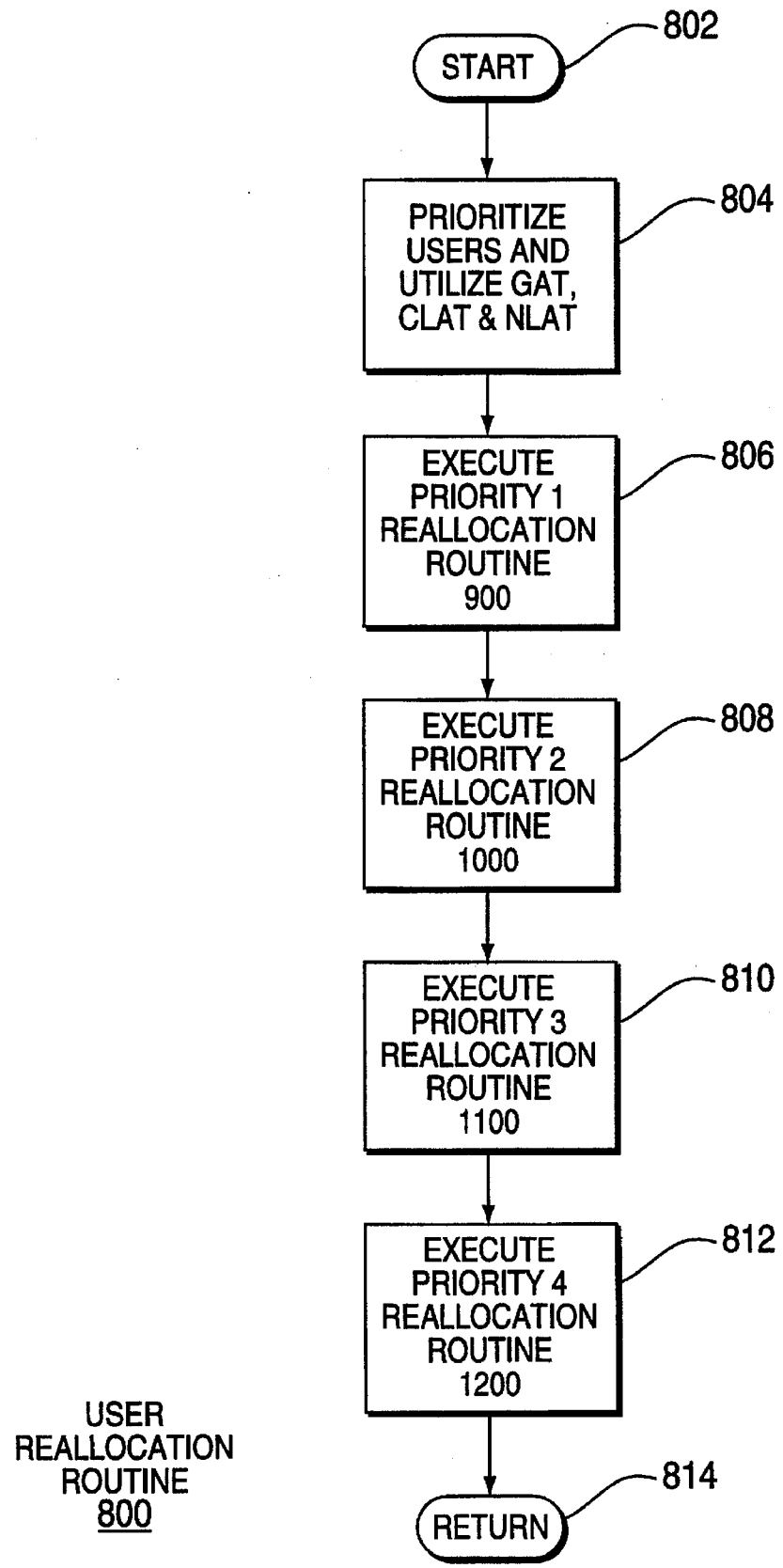
FIG. 8 depicts a flow chart of a USER REALLOCATION routine executed by the data distribution system shown in FIG. 2.

FIG. 8 depicts the USER REALLOCATION routine 800. Once per service period, this routine reallocates each of the users to an appropriate slot that implements the user's present mode of operation (function). The routine is entered at step 802 and proceeds to step 804 wherein the users are prioritized in accordance with their presently requested function and the function which they have requested to be implemented in the next service period.

Generally, this routine is used to reallocate the 30 users handled by the processor into 30 possible slots available in the service period. The reallocation is accomplished by comparing the information in the various allocation tables. This information informs a processor of the priority of a particular user, e.g., must a particular user access data from a particular processor or can the user access information from neighboring processors without an impact on the viewed data. For example, the highest priority, priority 1, is always assigned to users that are currently in play mode and they are still in play mode for the next service period. These users must be provided the next series of data words from the appropriate disk (disk critical) and at the correct time (time critical) or else the user will experience a jump or skip in the video. Additionally, the thermal recalibration process is assigned priority 1.

On the other hand, the users who are currently using, for example, fast-forward and are, in the next service period, going to be using play mode, do not need to be provided the exact next set of data words (not disk critical), but must be provided the data words at the appropriate time (time critical). If, when the video begins again in the play mode, the video data provided is offset by 80,000 words, the user would not really notice. Thus, users changing from fast-forward to play mode are assigned a lesser priority, priority 2. The following table summarizes the various modes and their priority assignments.

TABLE 1

Subscriber Prioritization Table

| PRIORITY | CLAT FUNC. | NLAT FUNC. | TIME CRITICAL | DISK CRITICAL |
|---|---|---|---|---|
| 1 | RECAL | RECAL | 1 | 1 |
| 1 | PLAY | PLAY | 1 | 1 |
| 2 | FF | PLAY | 1 | 2 |
| 2 | REV | PLAY | 1 | 2 |
| 2 | PAUSE | PLAY | 1 | 2 |
| 2 | PLAY | FF | 1 | 2 |
| 2 | FF | FF | 1 | 2 |
| 2 | PLAY | REV | 1 | 2 |
| 2 | REV | REV | 1 | 2 |
| 3 | NEW PROGRAM | PLAY | 3 | 3 |
| 3 | RANDOM | PLAY | 3 | 1 |
| 3 | STOP | PLAY | 2 | 2 |
| 3 | PLAY | PAUSE | 2 | 2 |
| 4 | PLAY | STOP | 2 | 4 |
| 4 | FFF | PLAY | 3 | 4 |
| 4 | FREV | PLAY | 3 | 4 |

Where:
Time Critical
1 = must be serviced this service period, special output
2 = must be serviced this service period, generic output
3 = must be serviced as soon as possible, no previous output
Disk Critical
1 = must be serviced by this disk subset
2 = must be serviced within ± 1 disk subset
3 = must be serviced within ± a few disk subsets
4 = must be serviced within ± many disk subset Special outputs are those that must be supplied to the user to facilitate accurate data recovery. In general, the video data is compressed and within the data are certain decompression control words that must be sent to the user's set-top unit at the proper time to facilitate accurate data decompression and proper screen display. As such, these special outputs (i.e., decompression control words and the data associated therewith) are assigned a greater time critical priority than the generic output. The generic output contains no compressed video data, but may contain control data necessary to the functionality of the set-top unit. If there was no previous output, then the requested output is not highly time critical, and the data can be produced in a subsequent service period, rather than the next service period, without viewer impact. For example, when proceeding from stop mode to play mode, a one service period delay in restarting the program would not greatly impact the viewer's appreciation of the video program.

The CLAT, associated with a given processor, defines the mode of operation (function) being performed by each user currently being serviced by that processor. If, during the service period, one of the users changes its function, the host computer updates the GAT with the user's new function and the address of the data that needs to be sent to that user to fulfill that function. The host computer broadcasts this change of mode to all the processors.

During the present service period, the processor retrieves the GAT information for the users it is presently servicing. This GAT information is placed in the NLAT. By comparing the NLAT functions with the CLAT functions, the processor determines, in accordance with Table 1, the priority for each of its present users. Additionally, at step 804, the NLAT and CLAT are swapped, i.e., the pointers to each table are swapped such that the CLAT information is now the NLAT information and vice versa. Since each of the processors accomplish this same prioritizing process, all of the users are now prioritized and the USER REALLOCATION routine 800 proceeds to step 806.

At step 806, the priority 1 users are reallocated to the appropriate slots by executing the PRIORITY 1 REALLOCATION routine 900. Once the priority 1 users are reallocated, the routine 800 reallocates, at steps 808, 810, and 812, the priority 2, 3 and 4 users by respectively executing the PRIORITY 2, 3 and 4 REALLOCATION routines 1000, 1100, and 1200. In general, using these routines, each processor attempts to allocate the lower priority users to an assigned slot. However, if too many users are supposed to be serviced by a single processor, the excess user is handed to another processor in another slot. Each of these routines is discussed in detail below. The USER REALLOCATION routine 800 returns, at step 814, to the USER SERVICE routine 700.

Figure 9:
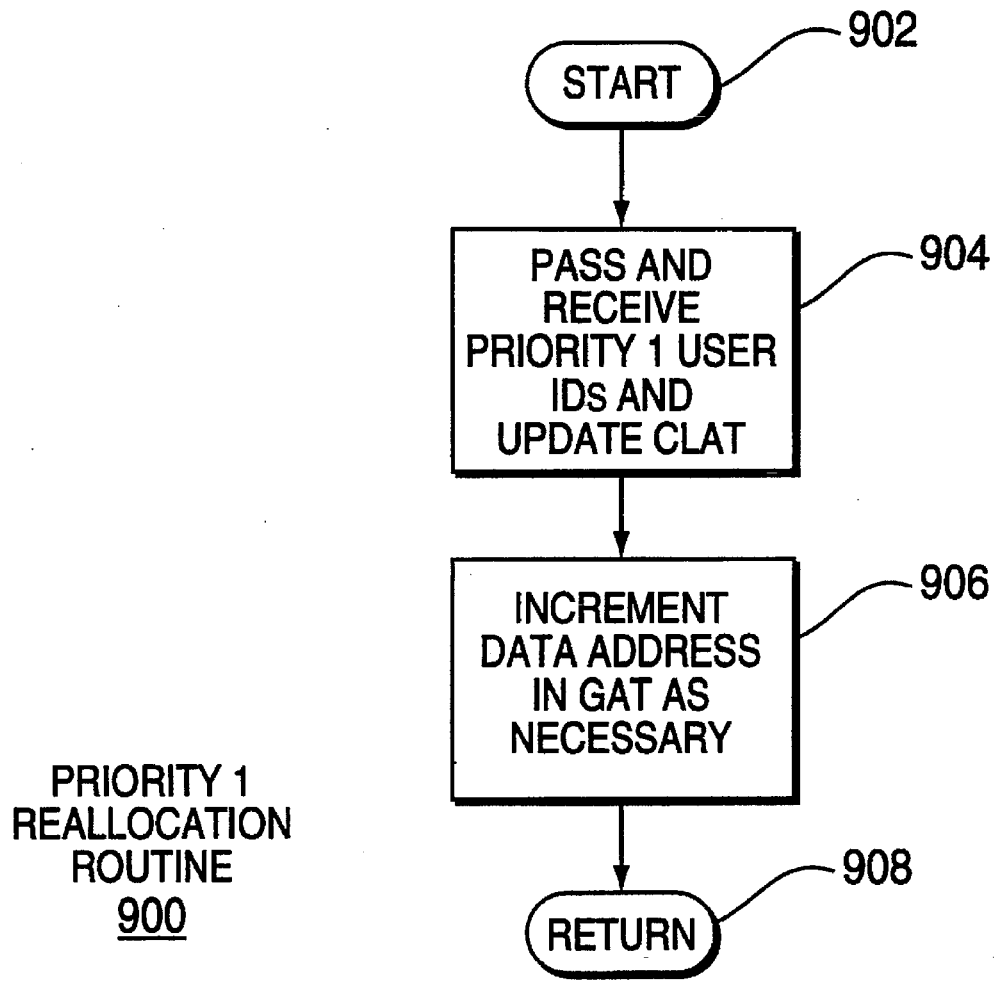
FIG. 9 depicts a flow chart of a PRIORITY 1 REALLOCATION routine executed by the data distribution system shown in FIG. 2.

FIG. 9 depicts the PRIORITY 1 REALLOCATION routine 900. The routine is entered at step 902 and proceeds to step 904. At step 904, the routine, using the IPC bus, passes the user IDs of the priority 1 users in its CLAT to a neighboring set of processors handling users in the next slot, e.g., the ID is passed five processors to the right. Simultaneously, the processor receives priority 1 user IDs from one of the processors defining the slot to the left. These processor IDs are placed into the CLAT.

At step 906, the user data addresses stored in the GAT must be updated for those users that have been passed from the last slot in a row, e.g., processors 501 through 505, to the first slot in the next row, e.g., processors 1 through 5. Generally, as users are passed from one slot to the next, the starting address of their required data does not change. However, when a user is reallocated from the last slot to the first slot in a new row, the required data address is incremented by 16,000 addresses. This occurs because of the manner in which the data is distributed across the disk drives (see FIG. 4 and its associated description). Consequently, the GAT address for that user must be updated.

At step 908, the PRIORITY 1 REALLOCATION routine 900 returns to the USER REALLOCATION routine 800.

Figure 10:
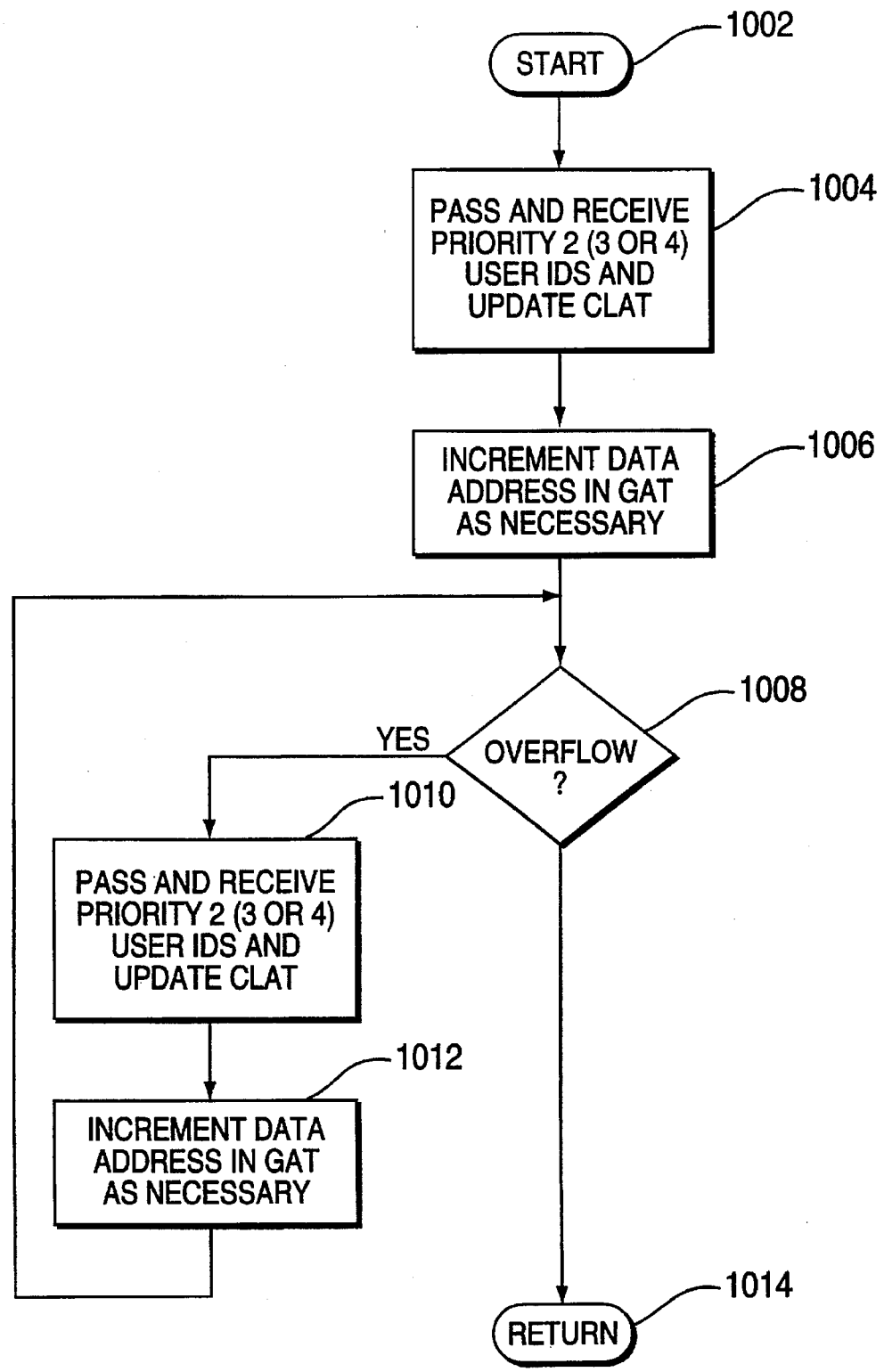
FIG. 10 depicts a flow chart of a PRIORITY 2, 3 AND 4 REALLOCATION routine executed by the data distribution system shown in FIG. 2.

FIG. 10 depicts a flow chart of the PRIORITY 2, 3 AND 4 REALLOCATION routine 1000. The routine will be described as it is used to reallocate priority 2 users. However, to reallocate priority 3 or priority 4 users, the routine is merely reexecuted to process those users.

The routine 1000 is entered at step 1002 and proceeds to step 1004. At step 1004, the routine, using the IPC bus, passes the user IDs of the priority 2 users to a destination processor that is typically a number of processors distant. The specific number of processors (or subsets of processors) that are skipped depends upon the priority of the user. For example, a user in the fast-forward mode (priority 2 user) may skip tens or even hundreds of processors depending on the system configuration. Thus, the routine, depending on the mode, addresses the user ID to an appropriate, but distant, processor. Simultaneously, the processor is receiving the user IDs of users that are to be reallocated to this processor. If the particular processor has not filled its 30 available slots with priority 1 users, it accepts the priority 2 users and places them in its CLAT. As with the PRIORITY 1 REALLOCATION routine, the PRIORITY 2 REALLOCATION routine must, at step 1006, increment the address in the GAT for users that have changed rows.

At step 1008, the routine queries whether the number of presently allocated priority 2 users is greater than the maximum allowed users, e.g., 30. If so, the excess users must be reallocated. Thus, if the query is answered affirmatively, the routine proceeds along the YES path to steps 1010 and 1012. These two steps repetitively pass and receive user IDs and update the GAT, as necessary, until no more priority 2 users require reallocation. At that point, the query at step 1008 is affirmatively answered and the PRIORITY 2 REALLOCATION routine returns, at step 1014, to the USER REALLOCATION ROUTINE 800.

To reallocate priority 3 and 4 users, the routine depicted in FIG. 10 is reexecuted for these users. As such, all the users are ultimately reallocated to appropriate slots (processors).

After executing the foregoing routines, for each service period, 16,000 data words for each of the 30 users is stored in the local memory associated with each processor. As such, a group of four successive processors defines a data element containing 4 data words (64-bits) for a particular user. The parity word is now ignored. Since the users are dynamically allocated, the specific location of a particular user's data is arbitrary. To facilitate use of a conventional multiplexing circuit, as the data is accessed and output from the server, it must be in a repeatable order. Therefore, to reorder the user data into a predefined order which can be easily utilized by the multiplexing circuit to distribute the data to the users, an output timing sequencer (OTS) is used to reorder the data.

Figure 11:
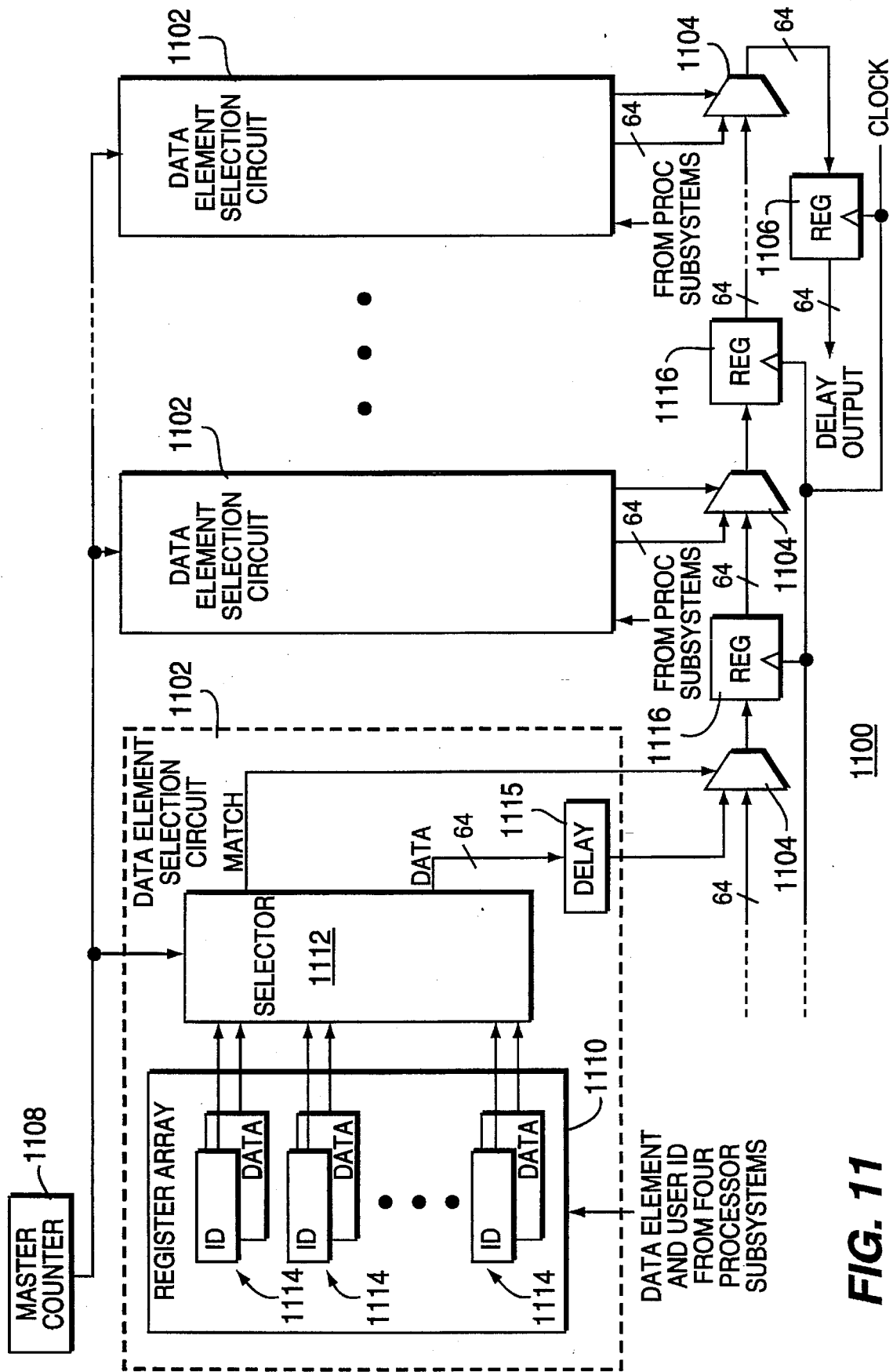
FIG. 11 depicts a block diagram of an output timing sequencer.

FIG. 11 depicts a block diagram of an OTS 1100. Generally, this circuit examines each element of data and reorders it in a predefined order. For simplicity, the predefined order is ascending order of user IDs, e.g., from 1 through 3000. Using the OTS, an arbitrary order of user output data becomes a 64-bit wide sequence of output data in ascending user ID order. The 64-bit wide sequence is defined as a succession of 64-bit data elements output on 64 parallel lines where the first bit of each user data element is located on line 1, the second bit of each user's data element is located on line 2, and so on for all 64-bits in a data element. Thus, the 64 parallel lines carry one bit for each user data element associated with the 3000 users. The elements are ordered from 1 to 3000, then repeat for a next set of data elements, and so on. Consequently, the arbitrarily ordered input data has now been provided a standard numerical ordering that is repeatable even though the users may be reallocated to any of the processors. As a result, the OTS circuit, in essence, has as its input a first multiplexed data stream and as an output a second multiplexed data stream. The second multiplexed data stream is a reorganized version of the first data stream.

Specifically, the OTS contains a master counter 1108, a plurality of data element selection circuits 1102, a plurality of multiplexers (MUXes) 1104, and an output register 1106. The master counter counts from 0 through 2999 and then rolls over to 0, i.e., the counter has a count that is equivalent to the number of users. As user data elements are available for output, each is stored within each data element selection circuit along with a user ID that corresponds to the stored data element. Thus, cumulatively the data element selection circuits stores a data element (4 data words or 64-bits) for each and every user, e.g., users 1 through 3000.

As the master counter 1108 sequentially counts from 1 to 3000, this count addresses the data element selection circuits and produces a data element from one of the circuits for each count of the master counter. The sequentially connected MUXes 1104 pass each of the data elements to 64-bit register 1106 for reclocking. After reclocking, the output is a multiplexed series of data elements that are organized in ascending order of user IDs.

More specifically, the data element selection circuits contain a register array 1110 capable of storing and double buffering the data elements of all the users within a service period, e.g., 30, as well as a user ID for each of the 4 word elements. Using double buffering enables the array to store elements while simultaneously retrieving elements. As such, the output registers of sixteen processors (a processor group) are connected to a data element selection circuit 1102. Each 64-bit register 1114 within the array is connected to a selector 1112. As the master counter counts, when its count is equivalent to a user ID within the array 1110, the data element associated with that user ID is passed through the selector to the delay 1115. When the master counter reaches 0, in a typical double buffering manner, the registers that were previously storing data are now accessed to retrieve data.

Additionally, if a data element is passed through the selector, a MATCH signal is generated which indicates that at this particular count this particular data element selection circuit 1102 has an output. The data element and the MATCH signal are held in the delay 1115 for predefined number of clock cycles. Specifically, the predefined number of clock cycles is equivalent to one clock cycle for each group of sixteen processors from the left this data element selection circuit represents. For example, the data element selection circuit that contains data from the left-most processor group does not have a delay, the circuit containing data from the next adjacent processor group has a 1 clock cycle delay, the circuit containing data from the next adjacent processor group has a 2 clock cycle delay, and so on.

After the appropriate delay is applied, the data element is applied to one input of the MUX 1104. The input selection is controlled by the MATCH signal. In this manner, if the MATCH signal is asserted, the MUX selects the input that connects to the data element selection circuit that produced the MATCH signal. Otherwise, the MUX defaults to the other input. Using this arrangement, one data element is produced for each master counter count. The data element presently passing through each MUX is clocked into a 64-bit wide register 1116. As such, upon each clock cycle, the data elements are passed through the MUXes 1104 and their associated registers 1116 to the output register 1106. Consequently, the output of the register 1106 is a series of 64-bit wide data elements ordered sequentially in the order of the user IDs, e.g., 1 through 3000.

In the foregoing discussion, the OTS circuit contained a single master clock and a plurality of delay circuits. However, such delay circuits require additional circuitry upon the OTS integrated circuit. Therefore, in an alternative embodiment, a plurality of master clocks, each individually connected to a data element selection circuit, are used. The initial starting count of each master clock is preset to provide an inherent count delay. For example, if the left-most master counter is initialized with a count of zero, the next adjacent counter is initialized with a count of 2999, the next adjacent counter is initialized with a count of 2998, and so on. As such, the counters provide an appropriate delay (1 clock cycle for each data element selection circuit) in retrieving data elements from the register array.

This reordered data element stream is easily handled by a multiplexing circuit to distribute the data elements to the proper user networks. It should be noted that, to simplify the description, the OTS was described as a separate circuit from the processor subsystems; however, those skilled in the art will realize that the OTS can be easily imbedded into the processor subsystems such that the register array is distributed amongst the subsystems.

Although various embodiments which incorporate the teachings of the invention have been shown and described in detail herein, those skilled in the art can readily devise many other varied embodiments that still incorporate these teachings. The apparatus and method disclosed herein find applicability in video servers, medical imaging, special effects and animation and location based entertainment systems among other applications.

We claim:
1. Apparatus for supplying, in response to user commands, independent streams of output data to a plurality of users, comprising:
a parallel processing computer containing a plurality of processors each connected to an information storage device;
an input/output circuit, connected to each of said processors, for distributing an input data stream amongst the processors such that each of the information storage devices stores a portion of the input data stream;
interface means, connected between said parallel processing computer and said users, for interpreting said user commands and causing said parallel processing computer to access, from each of said information storage devices, stored input data in accordance with the user commands; and enabling each individual user to manipulate the stream of data supplied to that individual user
said input/output circuit supplies each of said users with said accessed data as a stream of output data.
2. The apparatus of claim 1 wherein said manipulations include starting, stopping, pausing, fast-forwarding, and fast-reversing the stream of data.
3. The apparatus of claim 1 wherein said stream of input data is a multimedia program.
4. The apparatus of claim 1 wherein said information storage devices are disk drives.
5. The apparatus of claim 1 wherein said input/output circuit further comprises a multiplexing circuit such that multiple streams of output data are multiplexed with one another upon a transmission means for carrying said streams of output data to said users.
6. The apparatus of claim 1 further comprising a mass storage device for supplying said input/output circuit with said stream of input data.
7. The apparatus of claim 1 wherein said input/output circuit further comprises an interprocessor communications bus for enabling each of said processors to communicate with each of said other processors within said parallel processing computer.
8. The apparatus of claim 1 wherein said input/output circuit further comprises a output timing sequencer that reorders segments of data that comprise said stream of output data.

9. The apparatus of claim 8 wherein said output timing sequencer further comprises:

a register array for storing each of said data segments and a data segment identifying value for each of the data segments such that each data segment can be addressed by said segment identifying value;

a counter, connected to said register array, for incrementally counting such that each count of said counter corresponds to one segment identifying value in a series of segment identifying values;

means, connected to said register array and said counter, for retrieving a data segment corresponding to said segment identifying value generated by the counter; and means for repeating said retrieval of said data segments for each count of said counter such that an order of said data segments is consistent with an order in which the counter produces segment identifying values.

10. The apparatus of claim 1 further comprising means for storing additional input data in said information storage devices without interrupting production of said stream of output data for each of said users.

11. The apparatus of claim 1 further comprising means for identifying and correcting errors in said stream of output data without interrupting production of said stream of output data for each of said users.

12. The apparatus of claim 1 further comprising means for placing one or more of the information storage devices in an idle mode where data access is not being conducted to or from the information storage device, such that the information storage device is implicitly or explicitly triggered to perform internal housekeeping or recalibration tasks, without interrupting production of said stream of output data for each of said users.

13. The apparatus of claim 1 further comprising means for allocating users to the plurality of processors such that each user can utilize at least one processor to access data within an associated information storage device.

14. Apparatus for reordering data segments in a continuous stream of data segments, said apparatus comprising:

a register array for storing each of said data segments and a data segment identifying value for each of the data segments such that each data segment can be addressed by said segment identifying value;

a counter, connected to said register array, for incrementally counting such that each count of said counter corresponds to one segment identifying value in a series of segment identifying values;

means, connected to said register array and said counter, for retrieving a data segment corresponding to said segment identifying value generated by the counter; and means for repeating said retrieval of said data segments for each count of said counter such that an order of said data segments is consistent with an order in which the counter produces segment identifying values.

15. The apparatus of claim 14 further comprising:

a plurality of register arrays, each connected to independent streams of data segments and each data segment is associated with a unique segment identifying value;

said counter is connected to each of said register arrays; and means, connected to said counter and said register arrays, for retrieving from one of the plurality of register arrays a data segment corresponding to a segment identifying value generated by said counter.

16. The apparatus of claim 15 wherein said independent streams of data segments are generated by a parallel processing computer containing a plurality of parallel processors such that each data segment is produced by one processor in said plurality of parallel processors.

17. The apparatus of claim 15 wherein said plurality of register arrays are a plurality of output registers of said processors in said plurality of parallel processors.

* * * * *